United States Patent [19]

Kanehori et al.

[11] 4,277,452
[45] Jul. 7, 1981

[54] CARBON MONOXIDE ABSORBING LIQUID

[75] Inventors: Keiichi Kanehori, Hachioji; Shinkichi Horigome, Tachikawa; Masayuki Katsumoto, Kodaira; Yoshijiro Arikawa, Kure, all of Japan

[73] Assignees: Hitachi, Ltd.; Babcock-Hitachi Kabushiki Kaisha, both of Tokyo, Japan

[21] Appl. No.: 110,558

[22] Filed: Jan. 8, 1980

[30] Foreign Application Priority Data

Jan. 12, 1979 [JP] Japan .................................. 54-1350

[51] Int. Cl.³ ............................................ B01D 53/34
[52] U.S. Cl. ............................ 423/246; 423/415 A; 252/189; 252/192; 585/849
[58] Field of Search ................... 423/246, 247, 415 A; 252/189, 192; 585/846, 848, 849

[56] References Cited

U.S. PATENT DOCUMENTS

| | | | |
|---|---|---|---|
| 1,999,159 | 4/1935 | Peski | 423/246 X |
| 3,102,919 | 9/1963 | Hirschbeck et al. | 423/246 |
| 3,651,159 | 3/1972 | Long et al. | 585/848 |

*Primary Examiner*—Earl C. Thomas
*Attorney, Agent, or Firm*—Birch, Stewart, Kolasch & Birch

[57] ABSTRACT

The present disclosure is directed to a carbon monoxide absorbing liquid containing a cuprous ion, hydrochloric acid and titanum trichloride.

Titanium trichloride is effective in increasing the carbon monoxide absorption quantity. Furthermore, titanium trichloride remarkably increases the oxygen resistance. Therefore, this absorbing liquid can be used continuously and for a long time.

6 Claims, 3 Drawing Figures

CARBON MONOXIDE ABSORBING LIQUID

BACKGROUND AND SUMMARY OF THE INVENTION

1. Field of the Invention

The present invention relates to a carbon monoxide (CO) absorbing liquid. More particularly, the present invention is directed to a CO absorbing liquid which can absorb CO at a high speed with a large absorption quantity and can be used for a long time with a high oxygen resistance.

2. Description of the Prior Art

CO is contained in exhaust gases discharged not only from iron manufacturing plants but also from other various plants or in product gases in various plants. CO can be used as a fuel or as a starting material in the synthetic chemical industry, but CO is poisonous. Various processes for separating CO from exhaust or product gases have been proposed for utilization or removal of CO.

As the conventional CO-separating process, there can be mentioned a cryogenic method utilizing the difference in the boiling points between respective gases, an absorption method using a liquid capable of absorbing CO and a conversion method which comprises reacting CO with hydrogen or water in the presence of a catalyst to convert CO to methane or hydrogen, respectively.

Each of these conventional CO-separating processes involves certain defects as described below and thus a process which can continuously separate CO by a simple operation has not yet been developed.

In the cryogenic method, the treatment should be conducted at an extremely low temperature. In the conversion method, since the reaction is carried out at a high temperature, in the presence of a catalyst, the equipment and operation become complicated. The absorption method is simple because separation is accomplished by causing the gas to be treated to come in contact with an absorbing liquid so that CO can be absorbed in the absorbing liquid. However, CO absorbing liquid heretofore used for the absorption of CO are greatly influenced by the copresence of gases such as oxygen and carbon dioxide and also they cannot be used for a long time. Therefore, the absorption method has not been broadly adopted.

Recently, there has been proposed a so-called liquid film method as a novel gas separation technique for separating $CO_2$ from a gas mixture containing $CO_2$ and $O_2$ or separating hydrogen sulfide from gasified coal. This method is diagrammatically illustrated in FIG. 1. A protecting film 2 and a porous plate 3 are placed on both surfaces of a hydrophilic film 1, such as a hydrophilic polypropylene film impregnated with an absorbing liquid. A gas containing a component to be separated, such as CO, is caused to make contact with one surface of the liquid film 1 whereby CO is absorbed in the liquid film 1, and the other surface of the liquid film is subjected to pressure reduction or caused to make contact with another gas such as He, to desorb absorbed CO.

In the liquid film method, since absorption and desorption of CO can be performed simultaneously, a continuous gas treatment is possible. The liquid film method is also advantageous in that the required energy is small and the intended gas can be selectively separated.

In this liquid film method, properties of the liquid film especially the absorbing property, are obviously important. More specifically, the absorbing liquid that is used in the liquid film method should have a large gas absorption quantity and a high absorbing speed, and the absorbing liquid should be stable against other gases which may be present and degradation should not be caused by the copresence of said gases.

Also, in this newly proposed liquid film method, as in the above-mentioned absorbing liquid method, the absorbing liquid is very important, and if a good CO absorbing liquid is developed, it is expected that this absorbing liquid will be used broadly for the separation of CO in not only the liquid film method but also the absorbing liquid method.

Various CO absorbing liquids have heretofore been proposed. For example, in the CO separation method called the "COSORB method," which is disclosed in the specification of U.S. Pat. No. 3,651,159, a solution formed by dissolving $CuAlCl_4$ in toluene is used as the CO absorbing liquid. Although this absorbing liquid is advantageous in that the quantity of CO that can be absorbed is large, degradation by water is serious and this absorbing liquid can hardly be used for the treatment of gases containing water.

Further, a solution of an ammonia complex salt of cuprous chloride (CuCl), called an "ammonical CuCl solution" and a hydrochloric acid solution of CuCl, called "hydrochloric acid-CuCl," have been proposed as the CO absorbing liquid. Solutions containing copper ions are advantageous in that the CO absorption quantity is large. However, the ammoniacal CuCl solution is defective in that $CO_2$ or oxygen is absorbed in a large quantity and thus the life is short. The hydrochloric acid-CuCl solution is defective in that the cuprous ions are oxidized and the CO-absorbing capacity is degraded. In order to prevent this degradation of the CO-absorbing capacity, $SnCl_2$ is ordinarily added to the hydrochloric acid-CuCl solution, but even if $SnCl_2$ is added, the speed of absorption of oxygen causing oxidation is not lowered, and therefore, attainment of the effect of prolonging the life of the CO absorbing liquid cannot be expected.

SUMMARY OF THE INVENTION

It is a primary object of the present invention to provide a CO absorbing liquid which makes it possible to separate or remove CO at a high efficiency from exhaust gases discharged from various plants such as iron manufacturing plants, power generating plants and chemical plants.

Another object of the present invention is to provide a CO absorbing liquid which can be used continuously for a long period of time in the absorbing liquid method and the liquid film method for the separation of CO.

Still another object of the present invention is to provide a CO absorbing liquid which can absorb CO at a high speed with a large absorption quantity and which can be used stably for a long time because influences of co-present gases such as oxygen and carbon dioxide are remarkably reduced.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

In accordance with the present invention, the foregoing objects can be attained by adding titanium trichloride ($TiCl_3$) to a solution containing copper ions and hydrochloric acid. By the addition of titanuium trichloride, the oxygen resistance is highly improved, and therefore, the absorbing liquid can be used continuously for a long time.

DETAILED DESCRIPTION OF THE INVENTION

The present invention will now be described in detail with reference to the following Examples which are provided as being exemplary of the present invention and thus should not be considered as limiting the scope of the present invention.

EXAMPLE 1

A solution of 2 g of CuCl in 20 ml of 6 N hydrochloric acid, a solution of 2 g of CuCl and 0.5 g of stannous chloride ($SnCl_2.2H_2O$) in 20 ml of 6 N hydrochloric acid and solutions formed by adding 1 g of titanium trichloride ($TiCl_3$) to the above two solutions, independently, were prepared, and the CO absorption quantities of these 4 solutions were determined under a CO partial pressure of 760 mmHg at an absorbing solution temperature of 35° C. The obtained results are shown in Table 1.

As will be apparent from the results shown in Table 1, if $TiCl_3$ was added to the CuCl, hydrochloric acid solution and the $SnCl_2$-added CuCl, hydrochloric acid solution, in each case, the quantity of CO absorbed per unit amount of the copper ions was increased by 15 to 17%. Thus, it is evident that $TiCl_3$ is effective for increasing the CO absorption quantity.

In the instant specification, the CO absorption quantity is expressed in terms of the ratio of the moles of CO absorbed to the moles of copper ions contained in the absorbing liquid.

TABLE I

|  | $TiCl_3$ | |
|---|---|---|
|  | not added | added |
| CuCl | 0.30 | 0.35 |
| CuCl + $SnCl_2$ | 0.34 | 0.39 |

EXAMPLE 2

A solution of 20 g of CuCl, 14.6 g of $SnCl_2.2H_2O$ and 10 g of $TiCl_3$ in 200 ml of 6 N hydrochloric acid and a solution of 20 g of CuCl and 14.6 g of $SnCl_2.2H_2O$ were prepared, and each solution was charged in a brown flask and allowed to stand still in air. The change of the CO absorption quantity with the lapse of time was examined to obtain the results shown in FIG. 2. The experiment was conducted under a CO partial pressure of 760 mmHg and a liquid temperature of 35° C.

Figure 2:
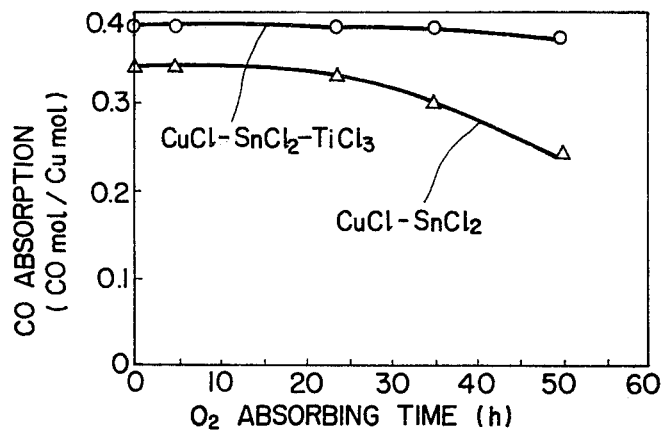
FIGS. 2 and 3 are curves illustrating the effects attained by the present invention.

As will be apparent from FIG. 2, in case of the solution containing $TiCl_3$ as well as CuCl, the CO absorption quantity was hardly changed even when the solution was allowed to stand still in air, and this solution had a good stability. However, if $TiCl_3$ was not added, after passage of about 20 hours, the CO absorption quantity was abruptly reduced. Thus, it is evident that $TiCl_3$ is very effective in eliminating the influences of oxygen.

EXAMPLE 3

The CO absorption quantities of solutions or suspensions prepared by adding 3.4 g of CuCl (Cu: 34 millimoles), 5.8 g of $CuCl_2.2H_2O$ (Cu: 34 millimoles) or 2.45 g of $Cu_2O$ (Cu: 34 millimoles) to 30 ml of an aqueous solution of $TiCl_3$ (16% by weight) and solutions or suspensions prepared by adding CuCl, $CuCl_2.2H_2O$ or $Cu_2O$ in the same amount as described above were determined under a CO partial pressure of 760 mmHg and at a liquid temperature of 35° C., to obtain the results shown in Table 2.

As will be apparent from the results shown in Table 2, each of the solutions or suspensions containing $TiCl_3$ had a large CO absorption quantity, but when $TiCl_3$ was not added, CO was not absorbed except in case of the CuCl suspension and even in case of the CuCl suspension, the CO absorption quantity was much smaller than that of the suspension containing $TiCl_3$.

Thus, it is apparent that $TiCl_3$ is very effective for the absorption of CO and if $TiCl_3$ is present, various copper salts can be dissolved and used as the copper ion source.

TABLE 2

|  | $TiCl_3$ Solution | Water |
|---|---|---|
| CuCl | 80 ml | 45 ml |
| $CuCl_2 . 2H_2O$ | 90 ml | 0 ml |
| $Cu_2O$ | 75 ml | 0 ml |

EXAMPLE 4

A solution made by dissolving 2 g of CuCl, 1 g of $TiCl_3$ and 1.5 g of $SnCl_2.2H_2O$ to 20 ml of 6 N hydrochloric acid was prepared, and a hydrophilic polypropylene film having a thickness of 25 $\mu$m was immersed in this solution to form a liquid film.

CO gas was passed on one side of this liquid film at a pressure of atmosphere and pure He was passed on the other side, and the amount of CO which permeated to the He side from the CO side was measured. It was found that the amount of CO which permeated the film per $m^2$ of the liquid film was 100 l(STP)/hour.

Since the CO permeation amount is in reverse proportion to the thickness of the film under the same conditions, if the thickness of the above polypropylene film was 5 $\mu$m, the CO permeation amount is 0.5 $m^3$(STP)/hour. This value is practically very large.

EXAMPLE 5

The same liquid film as described in Example 4 was prepared, and a gas containing 50% of CO and 50% of $N_2$ or a gas containing 50% of CO and 50% of $H_2$ was passed to one side of the liquid film and pure He was passed to the other side. In each case, the amounts of CO, $H_2$ and $N_2$ which permeated to the He side were measured. Each of the permeation amounts of $H_2$ and $N_2$ was smaller than 1/100 of the permeation amount of CO. Thus, it was shown that this liquid film has a capacity of permeating CO with a high selectivity and is very effective for separation of CO.

EXAMPLE 6

Since the absorbing liquid of the present invention is excellent in CO absorption quantity and oxygen resistance, it can be effectively used in place of the conventional absorbing liquids for the separation of CO.

A gas mixture containing CO was introduced from the bottom into a known CO absorbing column which was packed with a filler. The CO absorbing liquid of the present invention was sprayed from the top of the column by a nozzle or the like and caused to make contact with the CO-containing gas. Very good results were obtained as in the case of the liquid film method.

The CO-absorbed liquid was introduced into a stripping column and the CO was separated and the liquid was thus regenerated.

EXAMPLE 7

Figure 3:
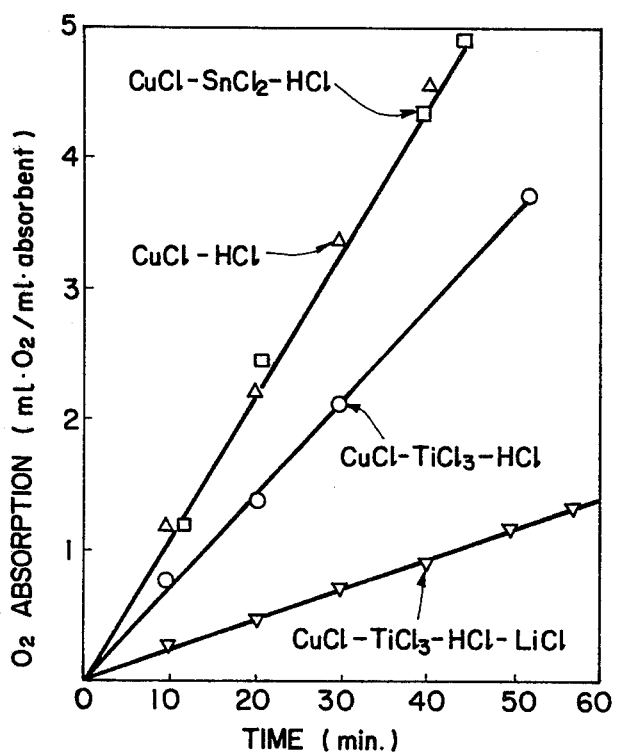

A solution (1) of 2 N CuCl and 7.5 N HCl, a solution (2) of 2 N CuCl, 0.3 N $SnCl_2$ and 7.5 N HCl, a solution (3) of 2 N CuCl, 0.3 N $TiCl_3$, and 7.5 N HCl and a solution (4) of 2 N CuCl, 0.3 N $TiCl_3$, 1.0 N HCl and 6.5 N LiCl were caused to make contact with $O_2$ maintained under 1 atmosphere. The $O_2$ absorption quantities of the solutions were determined with the results being shown in FIG. 3.

As will be apparent from a comparison of the lines showing the results obtained by using the absorbing liquids of the present invention with the lines showing the results obtained by using conventional absorbing liquids, the $O_2$ absorption quantity was remarkably reduced utilizing the absorbing liquid according to the present invention as compared with the conventional absorbing liquids, and if LiCl was also present, the O2 absorption quantity was further reduced.

Thus, it is evident that $TiCl_3$ is effective for reducing the oxygen absorption quantity and prolonging the life of the absorbing liquid. It is also evident that LiCl is effective as a substitute for HCl and has an effect of further promoting the reduction of the oxygen absorption quantity.

EXAMPLE 8

Figure 1:
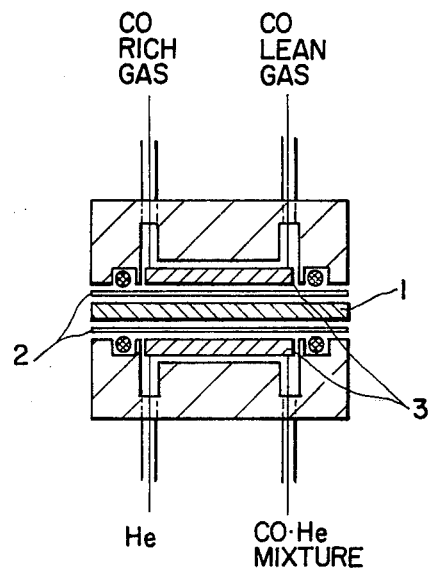
FIG. 1 is a diagram illustrating the structure of an apparatus used in the liquid film method.

The CO-separating apparatus using a liquid film has a structure shown in FIG. 1. When a copper net is arranged on the surface of the CO-containing gas side of the liquid film 1, the influences of oxygen are eliminated and especially good results are obtained.

A copper net may also be arranged on the surface of the He side of the liquid film or may be built into the interior of the liquid film 1.

If this arrangement is adopted, the influences of oxygen can be eliminated more effectively and separation of CO can be conducted continuously for a long period of time.

It is considered that in the present invention, CO is absorbed according to reactions represented by the following formulae (1) and (2):

$$Cu_2Cl_2 + 2HCl \rightarrow Cu_2Cl_2 \cdot 2HCl \quad (1)$$

$$Cu_2Cl_2 \cdot 2HCl + 2CO \rightarrow 2CuClCO + 2HCl \quad (2)$$

Accordingly, it is indispensable that the Cu ion should be in the form of $Cu^+$, and when a compound containing $Cu^{2+}$ is used as the copper source, an appropriate reducing agent should be present. As the reducing agent, there can be used various compounds such as stannous chloride, hydrazine, sodium thiosulfate and metallic copper. The reducing agent is added in an amount equivalent to the amount of the cupric ion, though the preferred amount is varied to some extent depending on the kind of reducing agent.

As is apparent from the above reaction formulae (1) and (2), the higher the copper ion concentration, the larger the amount of CO which is absorbed. Accordingly, it is preferred that the copper ion concentration is high in the CO absorbing liquid. However, if the concentration of the acid is low, precipitation of copper and/or copper compounds is caused. Therefore, if the copper ion concentration is increased, the concentration of hydrochloric acid should also be increased, which could cause fuming or corrosion of the equipment. Therefore, the applicable maximum concentration of hydrochloric acid is about 6 or 7 moles/l. Thus, the copper concentration is selected appropriately according to the concentration of CO in the gas to be treated. For example, when a blast furnace gas having a CO concentration of about 20% by volume is treated, good results are obtained if the copper ion concentration is adjusted to about 1 to about 4 moles/l.

As pointed out hereinbefore, the presence of the acid is indispensable for preventing precipitation of copper and/or copper compounds and as is seen from the above formulae (1) and (2), hydrochloric acid should be used as the acid.

Even if the concentration of hydrochloric acid is increased, absorption of CO is not inhibited at all but the amount of dissolved copper is increased and the absorption quantity of CO is increased.

However, if the hydrochloric acid concentration is extremely increased, the above-mentioned undesirable phenomena are caused. Accordingly, a part of the hydrochloric acid may be replaced with an alkali metal chloride such as for example, lithium chloride, sodium chloride or potassium chloride, or ammonium chloride so as to prevent the occurrence of such undesirable phenomena. Among these chlorides, lithium chloride is preferred because it is very effective in dissolving copper.

More specifically, when lithium chloride is used, it can dissolve cuprous chloride at a concentration nearly equal to ⅓ of the concentration of lithium chloride even without using the acid, and about 6 moles/l of copper can be dissolved. Accordingly, lithium chloride is used in a concentration of about 0.2 to about 12 moles/l. However, when cuprous chloride was dissolved only by lithium chloride, this solution is unstable against heating. Therefore, the presence of the acid is indispensable and when the liquid is actually used, it is made weakly acidic by the addition of the acid. In this case, the concentration of the acid is not particularly critical, and good results are obtained when hydrochloric acid is present at a concentration of about 0.1 mole/l. According to this embodiment, occurrence of undesirable phenomena such as fuming and corrosion of the equipment can be effectively prevented and a large quantity of cuprous chloride can be dissolved. Therefore, this embodiment is especially preferred from the practical viewpoint.

It is considered that $TiCl_3$ is prominently effective in increasing the oxygen resistance and prolonging the life of the absorbing liquid. Since it is considered that $TiCl_3$ has a function of retarding absorption of oxygen, good results are obtained even when the necessary amount of $TiCl_3$ is much smaller than the amount of the copper ions and it may, in fact, be about 10% of the amount of the copper ions or more. Furthermore, the solubility of cuprous chloride is increased by the presence of $TiCl_3$ and also, due to this function, the effect of increasing the CO absorption quantity is enhanced.

The CO concentration in a gas from which CO should be separated or removed is frequently about 5 to about 10% by volume or even higher, and in treating a gas having such a CO concentration, it is preferred that the copper ion concentration in the absorbing liquid be at least 0.5 mole/l. If the copper ion concentration is lower than this level, the CO removal ratio is reduced.

A typical carbon monoxide absorbing liquid contains the cuprous ion in a concentration of about 0.1 to 6 moles/l, the hydrochloric acid in a concentration of about 0.5 to 7 moles/l, and the titanium trichloride in a concentration of at least about 1/10 of the concentration of the cuprous ion. When the alkali metal chloride is included in the absorbing liquid, it is present in an amount of about 0.2 to 12 moles/l.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A carbon monoxide absorbing liquid which comprises a material containing cuprous ion in a concetration of about 0.1 to 6 moles/l, hydrochloric acid in a concentration of about 0.5 to 7 moles/l, and titanium trichloride in a concentration of at least about 1/10 of the concentration of the cuprous ion.

2. The carbon monoxide absorbing liquid as set forth in claim 1 which further contains an alkali metal chloride.

3. The carbon monoxide absorbing liquid as set forth in claim 2 wherein the alkali metal chloride is lithium chloride.

4. The carbon monoxide absorbing liquid as set forth in claim 3 wherein the concentration of lithium chloride is about 0.2 to about 12 moles/l.

5. The carbon monoxide absorbing liquid as set forth in claim 3 or 4 which is acidic.

6. A method of removing carbon monoxide from a gaseous mixture containing carbon monoxide in a concentration of at least about 5% by volume which comprises treating said gaseous mixture with an absorbing liquid containing cuprous ions in a concentration of about 0.1 to 6 moles/l, hydrochloric acid in a concentration of about 0.5 to 7 moles/l, and titanium trichloride in a concentration of at least about 1/10 of the concentration of the cuprous ions.

* * * * *